United States Patent
Libke et al.

(10) Patent No.: US 7,770,867 B2
(45) Date of Patent: Aug. 10, 2010

(54) PLUG VALVE WITH FLOW AREA EQUAL TO OR GREATER THAN THE FLOW AREA OF THE CONNECTED PIPING

(75) Inventors: Albert W. Libke, Rayalton, MN (US); Paranthaman Janagan, Fresno, CA (US)

(73) Assignee: DeZURIK, Inc., Sartell, MN (US)

( * ) Notice: Subject to any disclaimer, the term of this patent is extended or adjusted under 35 U.S.C. 154(b) by 756 days.

(21) Appl. No.: 10/993,437

(22) Filed: Nov. 22, 2004

(65) Prior Publication Data

US 2006/0108557 A1 May 25, 2006

(51) Int. Cl.
*F16K 5/12* (2006.01)

(52) U.S. Cl. .................. 251/209; 251/298; 251/309

(58) Field of Classification Search ........... 251/298, 251/208–209, 333, 309–312
See application file for complete search history.

(56) References Cited

U.S. PATENT DOCUMENTS

| | | | | |
|---|---|---|---|---|
| 1,844,046 A * | 2/1932 | Sheets | ........................ | 251/301 |
| 3,379,408 A * | 4/1968 | Lowrey | ........................ | 251/298 |
| 3,749,358 A * | 7/1973 | Bates | ........................ | 251/298 |
| 3,963,211 A * | 6/1976 | Myers | ........................ | 251/298 |
| 4,073,473 A * | 2/1978 | Rihm et al. | ........................ | 251/298 |
| 4,260,129 A * | 4/1981 | Groenefeld | ........................ | 251/298 |
| 4,399,976 A * | 8/1983 | Legris | ........................ | 251/315.08 |
| 4,863,144 A * | 9/1989 | Wilson et al. | ........................ | 251/298 |
| 4,989,833 A * | 2/1991 | Polon | ........................ | 251/209 |
| 5,170,992 A * | 12/1992 | Lenberg | ........................ | 251/304 |
| 5,186,433 A * | 2/1993 | Pausch | ........................ | 251/298 |
| 5,374,031 A * | 12/1994 | Semence et al. | ........................ | 251/305 |
| 5,480,123 A * | 1/1996 | Bey | ........................ | 251/305 |
| 5,642,751 A * | 7/1997 | Crawley | ........................ | 251/298 |
| 6,138,988 A * | 10/2000 | Bouvet et al. | ........................ | 251/306 |
| 2004/0020547 A1 * | 2/2004 | Mahabir et al. | ........................ | 138/137 |

FOREIGN PATENT DOCUMENTS

| | | | |
|---|---|---|---|
| CN | 1490544 | | 4/2004 |
| WO | WO 00/19133 | * | 4/2000 |

OTHER PUBLICATIONS

DeZurik, "4" (100MM) & Larger PEC Eccentric Plug Valves Technical Specifications, Aug. 2003, SPX Valves & Controls, whole booklet.
First Office Action from The State Intellectual Property Office of the People's Republic of China, in co-pending Application Serial No. 200580046006.1, issuing date, Dec. 19, 2008, "Plug Valve with Improved Flow Capacity," (6 pages).

* cited by examiner

*Primary Examiner*—John Bastianelli
(74) *Attorney, Agent, or Firm*—Pauly, Devries Smith & Deffner, L.L.C.

(57) ABSTRACT

A plug valve having an entry region, a chamber, and an outlet region, each with a flow area that is equal to or greater than the flow area of, for example, a standard wall ANSI B 36.10 (M) pipe connected to the inlet and outlet flanges of the valve. The valve's plug has a cylindrical front sealing face and a planar rear face. The axis of the sealing face is parallel to, but off-set from the axis of the plug. When the valve is fully open the planar rear face allows unimpeded flow through the chamber and substantially reduces friction to the flow. The valve's seat is cylindrical for mating with the cylindrical front sealing face of the plug. The seat has a rectangular outline shape.

14 Claims, 13 Drawing Sheets

PLUG VALVE WITH FLOW AREA EQUAL TO OR GREATER THAN THE FLOW AREA OF THE CONNECTED PIPING

FIELD OF THE INVENTION

The plug valve with improved flow capacity relates generally to the field of eccentric plug valves which may be used to control the flow of fluid in pipe systems.

BACKGROUND OF THE INVENTION

Eccentric plug valves 69 have been available to industry for some time, and typically include, as shown in FIG. 11, a main body 76 having an inlet port 73 outlet port 74 and a plug 75 mounted for rotation about a shaft 80, so that a plug front sealing face 81 is eccentrically rotated to either close off or open flow through a valve seat area 82, which is the area bounded by outlet edge 86 and chamber edge 86*a*. Such valves 69 are used, for example, in wastewater, mining, fresh water, and many other industrial and HVAC services. Inlet port 73 is inlet circular opening 85*a*. Outlet port 74 is outlet circular opening 85*b*. FIG. 13 represents the same valve 69 as shown in FIG. 11, except that flow through the valve of FIG. 13 is reversed and the valve is rotated 180°

The plug valves typically have a long service life and are known for their reliability. Many of the valves 69 are sold for use in sludge and slurry services such as wastewater, ash, mining tailings, and other similar applications. Eccentric plug valves 69 generally include two types: wherein the rotatable plug 75 and mating seat 82 is either cylindrical or spherical.

Cylindrical plugs 75 are desirable and seal against a cylindrical seat 82 around a seal seat area 82. When the valve 69 is closed, a seal is created between the plug 75 and a typically nickel, or other corrosion resistant, seat 82. Oftentimes, the valves 69 have a restriction in their internal flow when open, because due to internal configuration the flow area may for example be only approximately 80% of the internal flow area of inlet pipe 17 and outlet pipe 17*a* for which the valve 69 is connected. The seat opening is the area surrounded by outlet edge 86. The plugs 75 are normally elastomer faced for tight fluid shutoff and for abrasion and erosion resistance. Valves 69 are often provided with a standard "face to face" length conforming to US and ISO standards for plug valves. "Face to face" is the length of a valve as measured from the face of the inlet flange to the face of the outlet flange.

Eccentric plug valves 69 are quite versatile. In most liquid service for example, it is recommended that the valve 69 be installed with the nickel seat 82 in the downstream location of the valve 69, as shown in FIG. 11. In the case of suspended solid service such as slurry and sludge, it is sometimes recommended that the valve 69 be installed with the seat 82 upstream and/or with shaft 80 axis horizontal, such that the plug 75 is raised above inlet pipe 17 and outlet pipe 17*a* centerline when the valve 69 is open, as shown in FIG. 13. This assists with keeping the plug 75 and bearings away from accumulated settled grit, fines and other debris that can accumulate in the bottom of a valve main body 76.

While the above valve 69 designs are quite useful, available industrial plug valve 69 designs, such as the examples shown in FIGS. 11 and 13, have typically had a restriction to the fluid flow that occurs due to restrictions in the flow area configuration of the valve 10, for example, the flow area of the valve is approximately 80% of the flow area of inlet pipe 17 and outlet pipe 17*a* in some designs.

One solution to this has been to install an oversized valve 69, so that the seat opening, sometimes referred to as the port area, of valve 69 will effectively be 100% or more of the flow area of inlet pipe 17 and outlet pipe 17*a*. However, this has the disadvantage that the oversized valve 69 is heavy, expensive, and may require a larger actuator which may also be more expensive, as opposed to a more desirable compact unit. Further, the oversized valves 69 will be made with a smaller flange but will have an increased face to face length. This reduces interchangeability of the valves 69.

Another disadvantage of the known plug valves 69 is that where they are installed in sludge or slurry service, the intersection (located at 99) of circular opening 85*a* and internal cylindrical wall 84, as shown in FIGS. 11 and 13, can sometimes form a partial wedge shaped dam that allows sediment and other debris to accumulate in the lower section of the valve 69 as noted above.

Accordingly, it is desirable to have an improved plug valve 69 with cylindrical seating that enhances fluid flow and/or ameliorates the buildup effects of suspended solids use.

SUMMARY OF THE INVENTION

The foregoing needs are met, to a great extent, by an improved plug valve 10 with cylindrical seating 44 that enhances fluid flow and/or ameliorates the effect of suspended solids.

Embodiments of plug valve 10, comprise a valve body 12 having an inlet port 11 and an outlet port 13 having a seat opening 21; and a plug 16 rotatably mounted in the valve body 12 having a cylindrically curved front sealing face 24 and a substantially planar rear face 22 opposite to the curved front sealing face 24. The seat opening 21 is the area surrounded by outlet edge 45, as shown in FIGS. 1, 5-10, and 12. Valve body 12 has a bonnet 14 and a main body 12*a*.

Embodiments of plug valve 10, comprise a valve body 12 having an inlet port 11 and an outlet port 13 having a seat opening 21, and a plug 16 rotatably mounted in valve body 12 having a cylindrically curved front sealing face 24. Inlet port 11 comprises an entry region 38*a*. The shape of entry region 38*a* changes from its shape at inlet port 11 (inlet port 11 and circular inlet opening 36*a* are synonymous) to its shape between vertical inlet edge 42 and rear edge 40. However, notwithstanding the shape change of entry region 38*a*, the flow area of entry region 38*a* remains greater than or equal to 100% of the flow area of a standard wall ANSI B 36.10 (M) inlet pipe 17 and outlet pipe 17*a*. The flow area of seat opening 21 is greater than or equal to 100% of the flow area of a standard wall ANSI B 36.10 (M) inlet pipe 17 and outlet pipe 17*a* because it is sized to be so. Furthermore, outlet port 13 comprises an outlet region 38*b*. The shape of outlet region 38*b* changes from its shape at seat opening 21 to its shape at outlet port 13 (outlet port 13 and circular outlet opening 36*b* are synonymous) However, notwithstanding the shape change of outlet region 38*b*, the flow area of outlet region 38*b* is greater than or equal to 100% of the flow area of a standard wall ANSI B 36.10 (M) standard wall ANSI B 36.10 (M) inlet pipe 17 and outlet pipe 17*a*. Entry region 38*a* extends (i) along straight sidewall 43 beginning at circular inlet opening 36*a* and ending at rear edge 40 on the right side of main body 12*a* and (ii) along tapered sidewall 41 beginning at circular inlet opening 36*a* and ending at inlet edge 42. Straight sidewall 43 extends inward from inlet opening 36*a* to rear edge 40 in a straight line, i.e., straight sidewall 43 is not tapered, as is tapered sidewall 41. Although, sidewall 43 is straight in the direction from circular inlet opening 36*a* to rear edge 40, it is cylindrical with respect to circular inlet opening 36*a*. Outlet region 38*b* extends from seat opening 21 along tapered face 46 to circular outlet opening 36*b*.

Embodiments of plug valve 10, comprise body 12 having an inlet port 11 and an outlet port 13 having a seat opening 21 and plug 16 rotatably mounted in body 12 having a cylindrically curved front sealing face 24 and a substantially planar rear face 22 opposite to the curved sealing face 24.

Embodiments of a method of improving flow is in a plug valve 10, having an inlet port 11 and an outlet port 13 having a seat opening 21, comprising, rotating a plug 16 mounted in body 12 having a cylindrically curved front sealing face 24 and a substantially planar rear face 22 opposite to the curved front sealing face 24, wherein plug 16 is moveable between an open position and a closed position, so that in the open position the rear face 22 of plug 16 is aligned with a vertical inlet edge 42 and a substantially vertical outlet edge 45.

There has thus been outlined, rather broadly, certain embodiments of plug valve 10 and the method of improving flow through a plug valve 10 in order that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment of plug valve 10 in detail, it is to be understood that plug valve 10 is not limited in its application to the details of construction and to the arrangements of the components set forth in the following description or illustrated in the drawings. Plug valve 10 and the method of improving flow through the plug valve is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of plug valve 10 and method of improving flow. It is important, therefore, that the claims be regarded as including such equivalent constructions insofar as they do not depart from the spirit and scope of plug valve 10 and method of improving flow.

DETAILED DESCRIPTION

Figure 1:
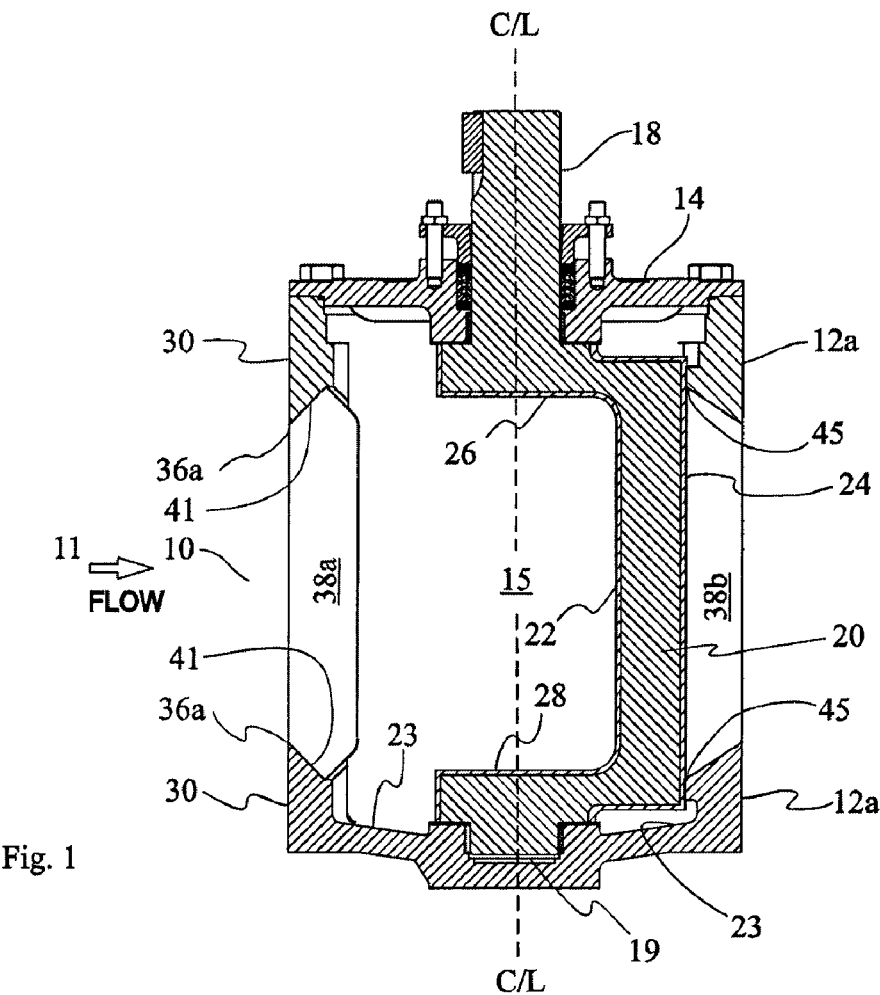
FIG. 1 is a cross-sectional view of a plug valve 10 according to an embodiment taken through line 1-1 in FIG. 2.

The embodiments provide an improved plug valve 10 and flow control method with cylindrical seating 44 that enhances fluid flow and/or ameliorates the effect of suspended solids. An embodiment will now be described with reference to the drawing figures, in which like reference numerals refer to like parts throughout.

Among other aspects, plug valve 10, as compared to a prior art plug valve 69, has an overall flow area (from inlet 11 to outlet 13) that is equal to or greater than 100% of the flow area of a standard wall ANSI B 36.10 (M) inlet pipe 17 and outlet pipe 17a to which valve 10 are connected. It has a plug region 20 with a rear face 22 that is planar and, unlike the rear face of prior art plugs, does not extend into the flow area of chamber 15. The rear face 22 to streamline the flow through chamber 15 and to remove a restriction to the flow through valve 10. Furthermore, rear face 22 is flush with an inlet edge 42 and an outlet edge 45 to further eliminate a restriction to flow through valve 10 and to protect plug 16 from impingement and concomitant abrasion from particles in the fluid passing through valve 10. Additionally, valve 10 has an enlarged entry region 38a, as compared to a prior art plug valve 69, which provides for increased flow capacity and flow coefficient. The seat opening 21 and an outlet region 38b of plug valve 10 are both sized to also have a flow area that is equal to or greater than 100% of the flow area of inlet pipe 17 and outlet pipe 17a to which valve 10 is connected.

Figure 2:
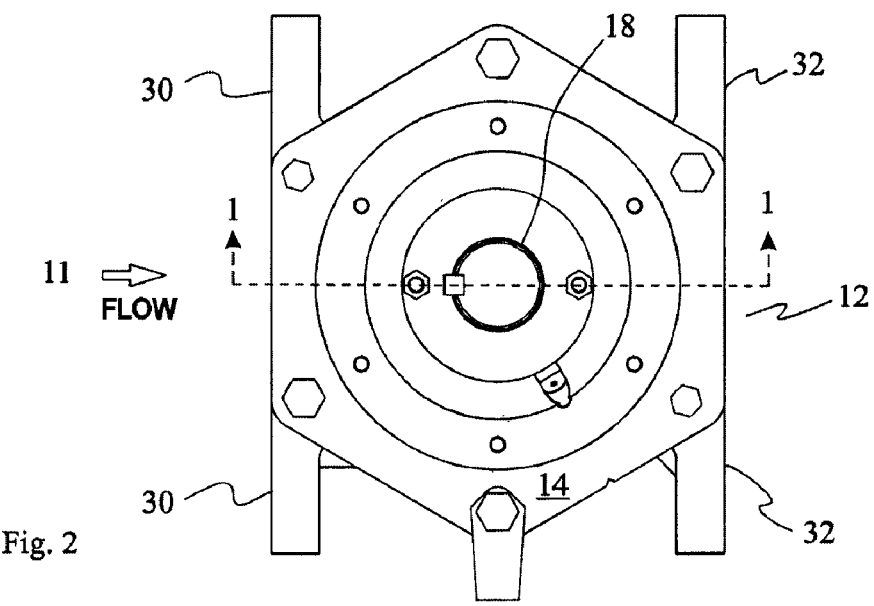
FIG. 2 is a top view of a plug valve 10 according to an embodiment.

FIG. 1 illustrates an embodiment of a plug valve 10, including a body 12a, a bonnet 14, and a plug 16. The plug 16 is rotatably mounted within the chamber 15 formed by body 12 and is movable between open and closed positions as will be described in more detail below. FIG. 2 is a top view of the arrangement shown in FIG. 1 and further illustrates body 12 and upper shaft 18 of plug 16.

Figure 3:
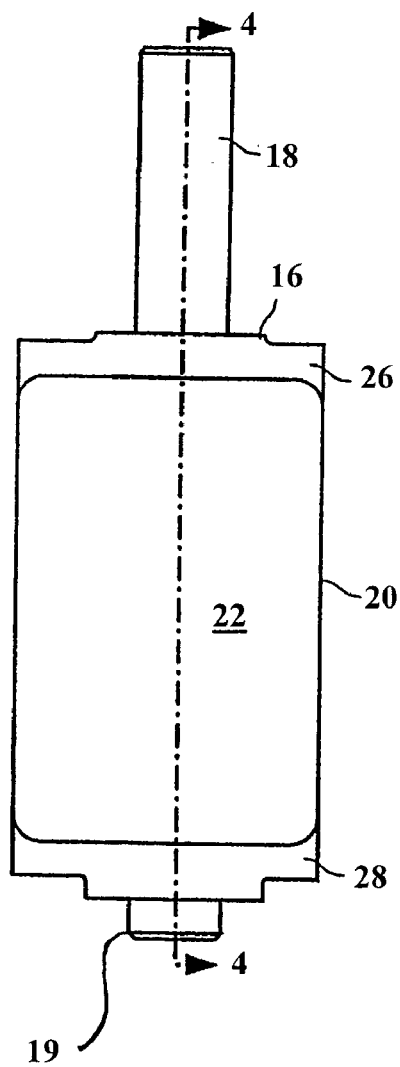
FIG. 3 is a side view of a plug 16 used in the embodiment of FIG. 1.
Figure 4:
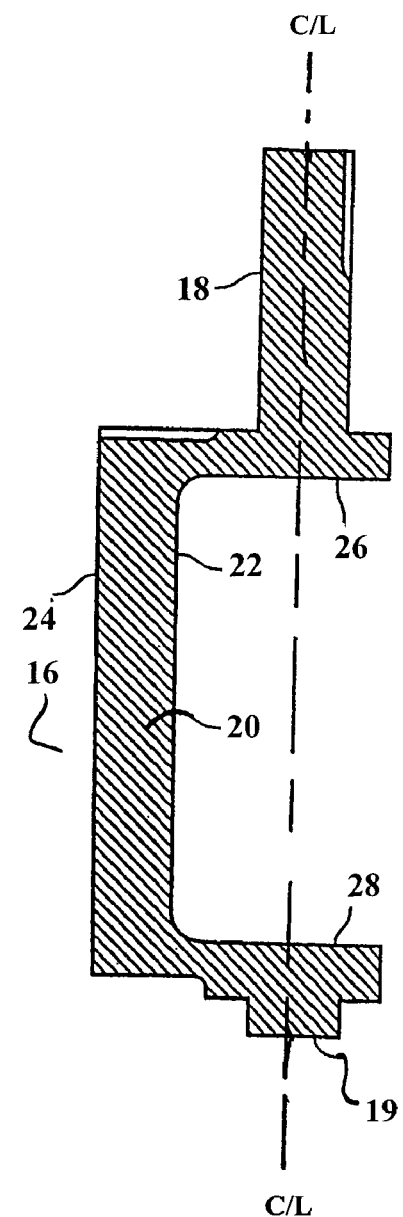
FIG. 4 is a cross-sectional view taking through line 4-4 in FIG. 3.
Figure 12:
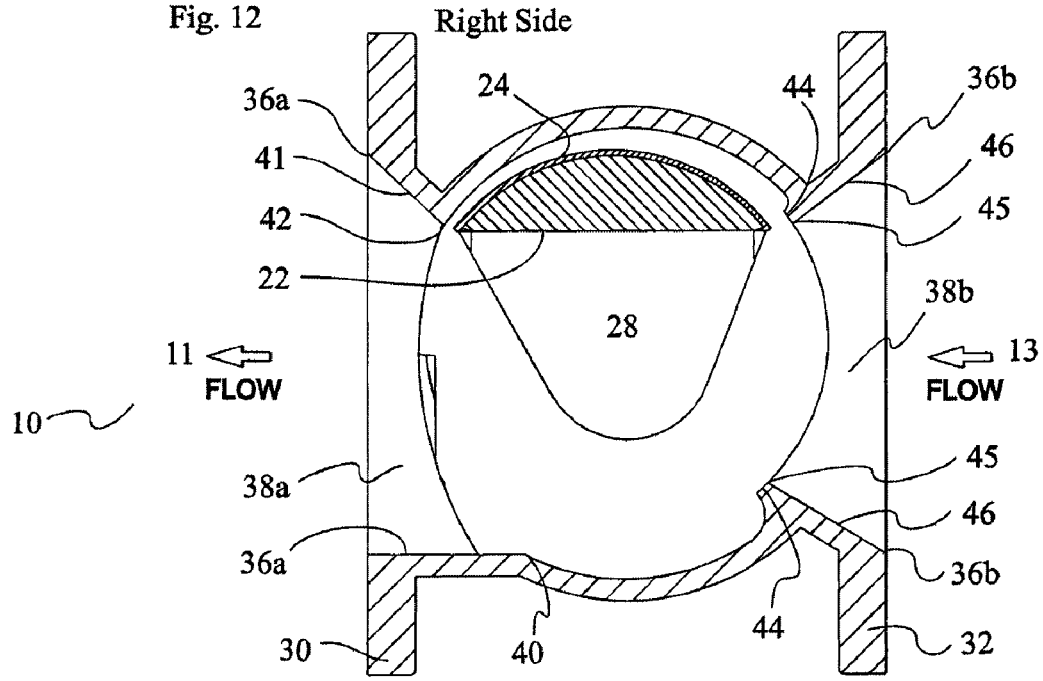
FIG. 12 is a diagram similar to FIG. 10, but showing main body 12a installed in a reverse orientation.

Turning now to FIGS. 3 and 4 in particular, plug 16 is illustrated to have upper shaft 18, a plug region 20 having a rear face 22 and a front sealing face 24, and upper and lower connecting regions 26 and 28. A lower shaft 19 is also mounted by a bushing for rotation with respect to main body 12a and upper shaft 18 is mounted for rotation with respect to the bonnet 14. Thus, the plug 16 is mounted for rotation about an axis of rotation that is a longitudinal axis through shafts 18 and 19. Although the embodiment is shown with a unitary plug 16 having integral top and bottom shafts 18 and 19, in other embodiments a separate top and/or bottom shaft can be attached to plug 16, for example by being pinned to the plug 16. The direction parallel to the axis of rotation is referred to herein as "vertical" in order to provide a useful reference coordinate. Other directions and orientations will be described as vertical, meaning they are parallel to this axis. However, it is to be understood that the valve 10 may actually be installed in any orientation, including an orientation where the rotational axis is horizontal relative to the direction of gravity, and in such case, the reference to vertical refers to parallelism with this rotational axis, and not necessarily to the direction of gravity. Also, although FIGS. 1-10 show flow in one direction from an inlet 11 to outlet 13 it will be appreciated that in some installations the orientation of the valve 10 is reversed so that the "inlet" and "outlet" sides are reversed. This type of installation an example of which is shown in FIG. 12, is typically intended for installations high in sludge and/or particulates.

Figure 5:
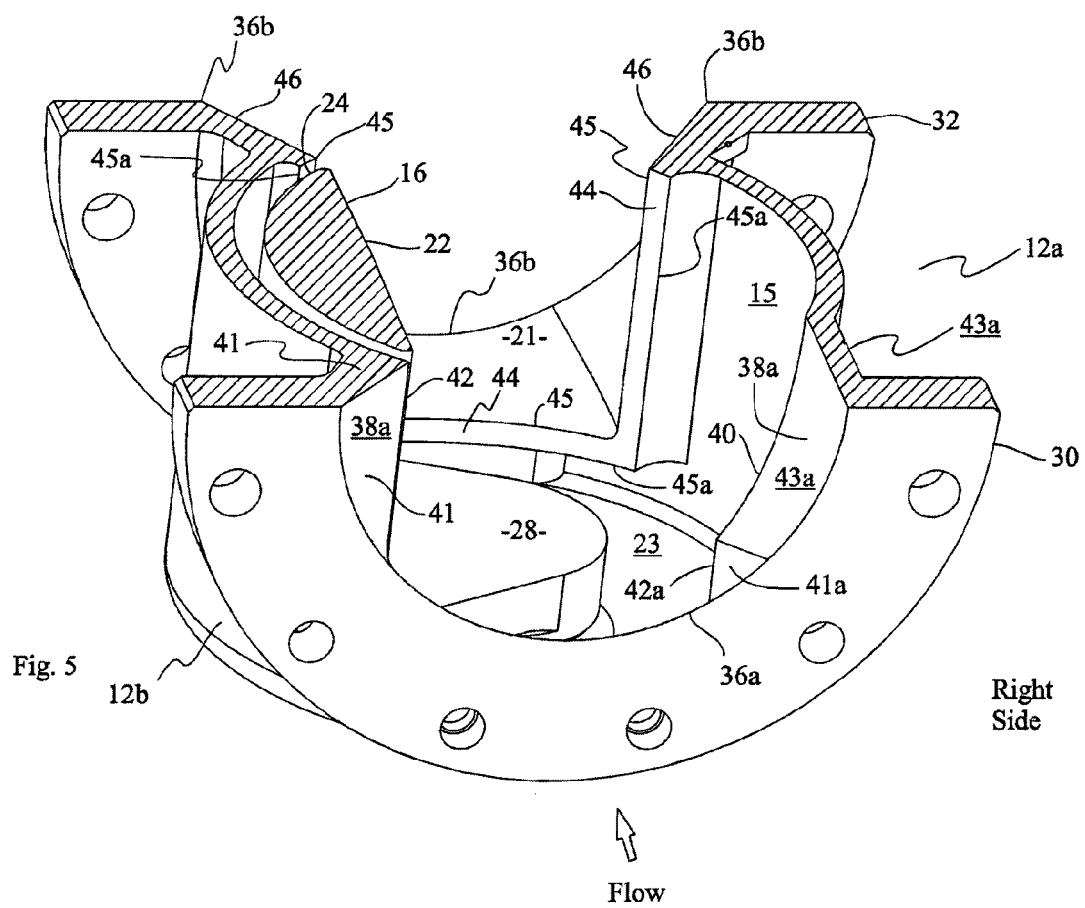
FIG. 5 is a cut away perspective view of an embodiment of main body 12a of plug valve 10.
Figure 5A:
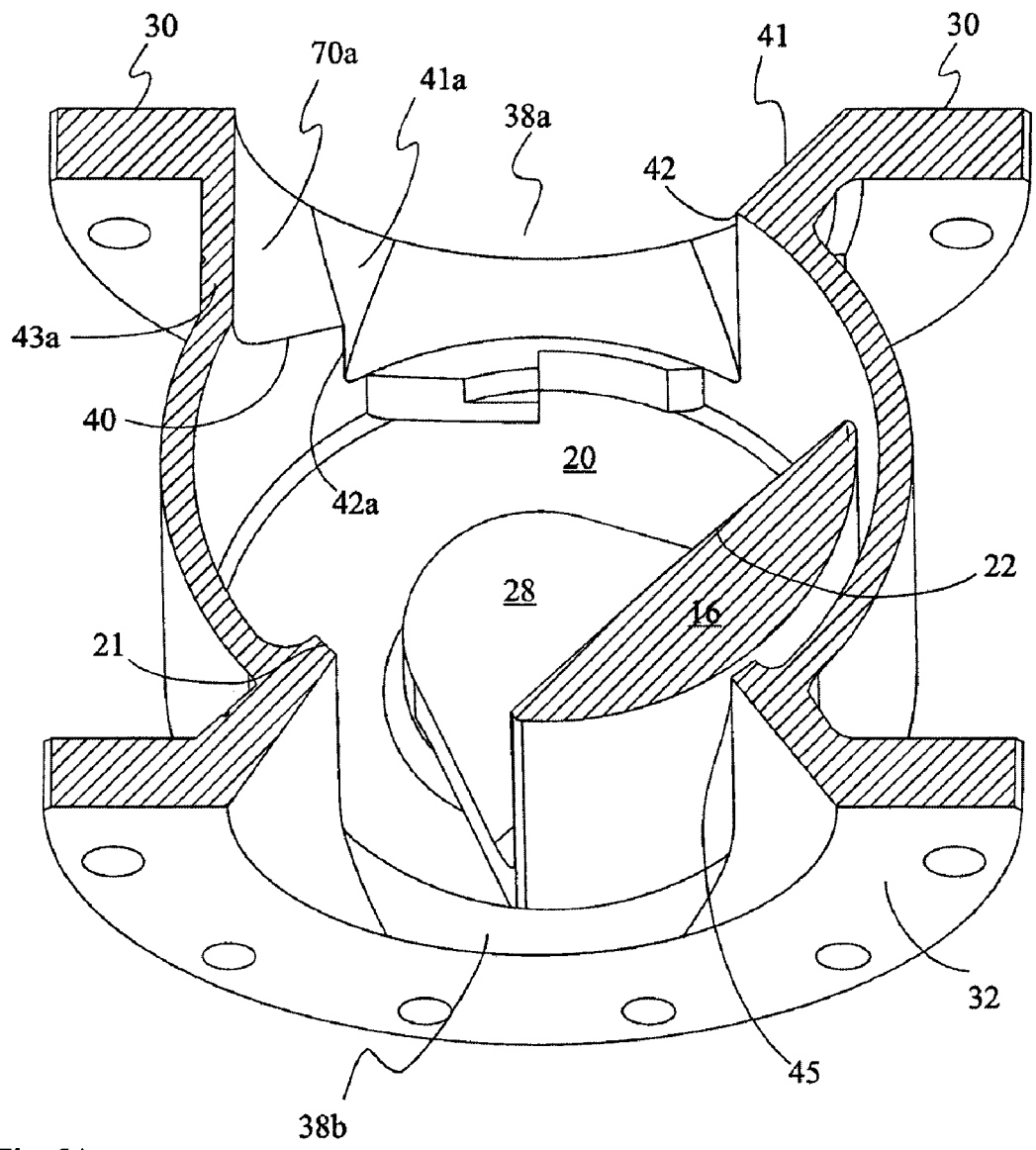
FIG. 5A is a perspective view of an embodiment of the main body with the plug partially closed, viewed from the outlet opening.
Figure 5B:
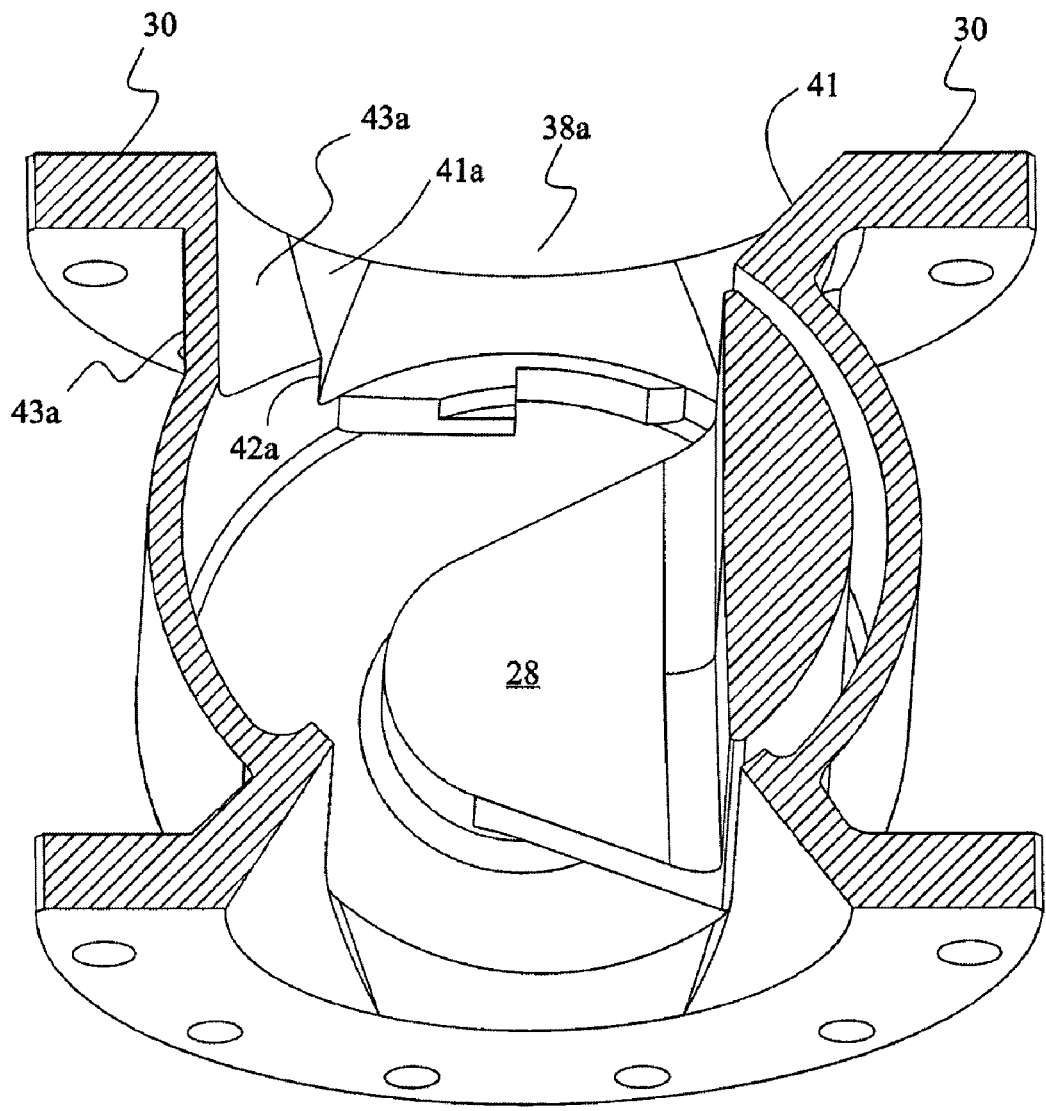
FIG. 5B is a perspective view of an embodiment of the main body with the plug in the open position, viewed from the outlet opening.

Turning to FIG. 5, additional features of plug 16 and main body 12a are illustrated. FIG. 5 illustrates that the rear face 22 of the plug 16 has a substantially flat or planar profile as shown, while the front sealing face 24 has a cylindrical profile shape. The main body 12a includes an inlet flange 30 and an outlet flange 32. The inlet flange 30 leads to an inlet flow path area, referred to as entry region 38a, which transitions from a circular opening 36a, on the right side of main body 12a to a slightly narrower curved, straight sidewall 43 entry transition region leading to rear edge 40 and from circular opening 36a, on the left side of main body 12a, to tapered sidewall 41 leading to a relatively straight vertical corner inlet edge 42.

FIGS. 5-7, 10, and 12 are cross sectional views of plug 10 taken at a point that is intermediate from the full height of valve 10 and taken perpendicular to the axis of rotation of plug 16. In these views it is readily apparent that tapered sidewall 41, on the left side, is tapered from circular opening 36a towards chamber 15 and that straight sidewall 43, on the right side, is not tapered, as is tapered sidewall 41. Chamber 15 encompasses the space, as best illustrated in FIGS. 1 and 5, defined by the inside surface of bonnet 14, the inside surface of floor area 23 of main body 12a, and the remaining inside surface of main body 12a between outlet edge 45 and the plane formed by rear edge 40 and inlet edge 42.

When the valve 10 is in the open position shown in FIG. 5, the flat surface of rear face 22 of plug 16 is substantially aligned with inlet edge 42. A cylindrical rectangular seat area 44 is provided against which the front sealing face 24 of plug 16 engages when valve 10 is in a closed position, as will be described in further detail below. Downstream of seat 44, the flow path generally expands due to diverging tapered surfaces 46 leading to the outlet flange 32. The seating surface of rectangular valve seat 44 has a cylindrical shape that matches the shape of the front sealing face 24 of plug 16. The seat 44 is a section of a cylinder and the seat opening 21 (the area surrounded by outlet edge 45) is substantially rectangular.

Figure 6:
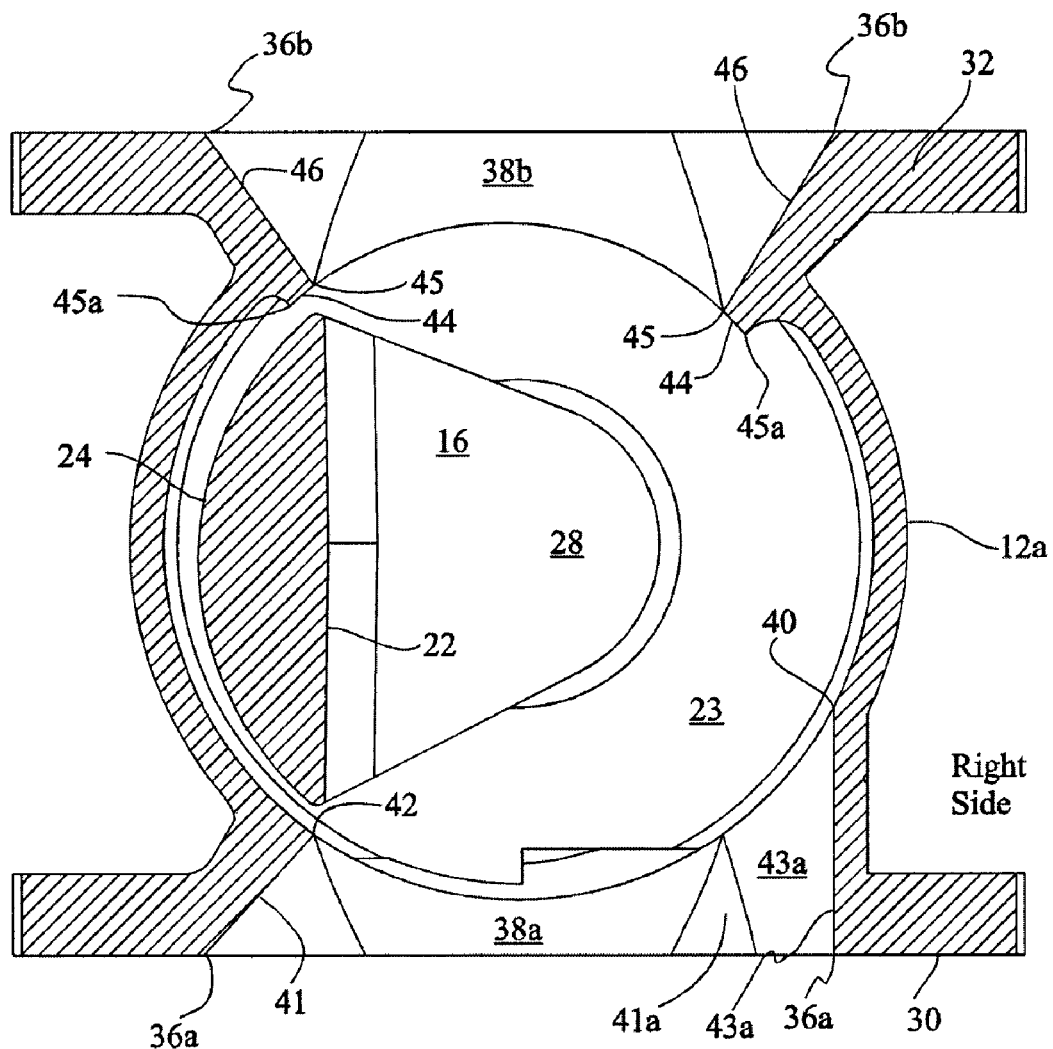
FIG. 6 is a cut away top view of main body 12a of plug valve 10 of FIG. 5 shown in an open position.

The valve 10 is shown in an open position in FIG. 6. The main body 12a includes the inlet flange 30, and the curved (curved in that it follows a portion of the circumference of circular inlet opening 36a), straight (straight in that it extends in the direction of the path of fluid flow as shown in FIGS. 5 and 6) sidewall 43 of entry region 38a leading to a rear side edge 40. The other rear vertical side inlet edge 42 is also shown and it is in substantial alignment with the rear surface 22 of the plug 16. Also shown is the front sealing face 24 of the plug 16 and the overall seat 44, as well as diverging tapered surfaces 46.

It will be appreciated that the generally cylindrical, rectangular outline of the seat 44 has a vertical outlet edge 45 that is generally aligned with and does not project beyond the plane formed by the vertical rear surface 22 of the plug 16. Thus, FIG. 6 illustrates a generally planar relationship between the vertical inlet edge 42, the vertical outlet edge 45, and the rear face 22 of plug 16.

As will be discussed in more detail below, it will be appreciated that this provides a smooth and uninterrupted flow boundary along the plane shown in the left side of the flow area of the arrangement of FIG. 6. Further, on the regions to the right side of FIG. 6, the relatively straight vertical rear edge 40 and its smooth transition contour at the cylindrical gradual transition of entry region 38a will provide for a fairly straight and wide flow path.

As shown in FIGS. 1, 3, 4, and 6A, front sealing face 24 of plug region 20 is circular and off-set from, but parallel to, the axis of rotation of plug 16. Therefore, front sealing face 24 is eccentric with respect to concentric axis of rotation of plug 16. The axis of rotation of plug 16 lies on the vertical center line of body 12 and shafts 18 and 19, as best shown in FIG. 1. The origin of the radius of circular, front sealing face 24, as well as seat 44, is the vertical axis of eccentricity, located at point Q in FIG. 6A. The vertical axis of eccentricity Q is parallel to the vertical axis of rotation of plug 16, located at point P in FIG. 6A. The origin of the radius of front sealing face 24, as well as seat 44, is not the vertical axis of rotation P of plug 16 in FIG. 6A. Plug 16 rotates concentrically around its vertical axis P, but front sealing face 24 rotates eccentrically around its vertical axis Q.

Figure 6A:
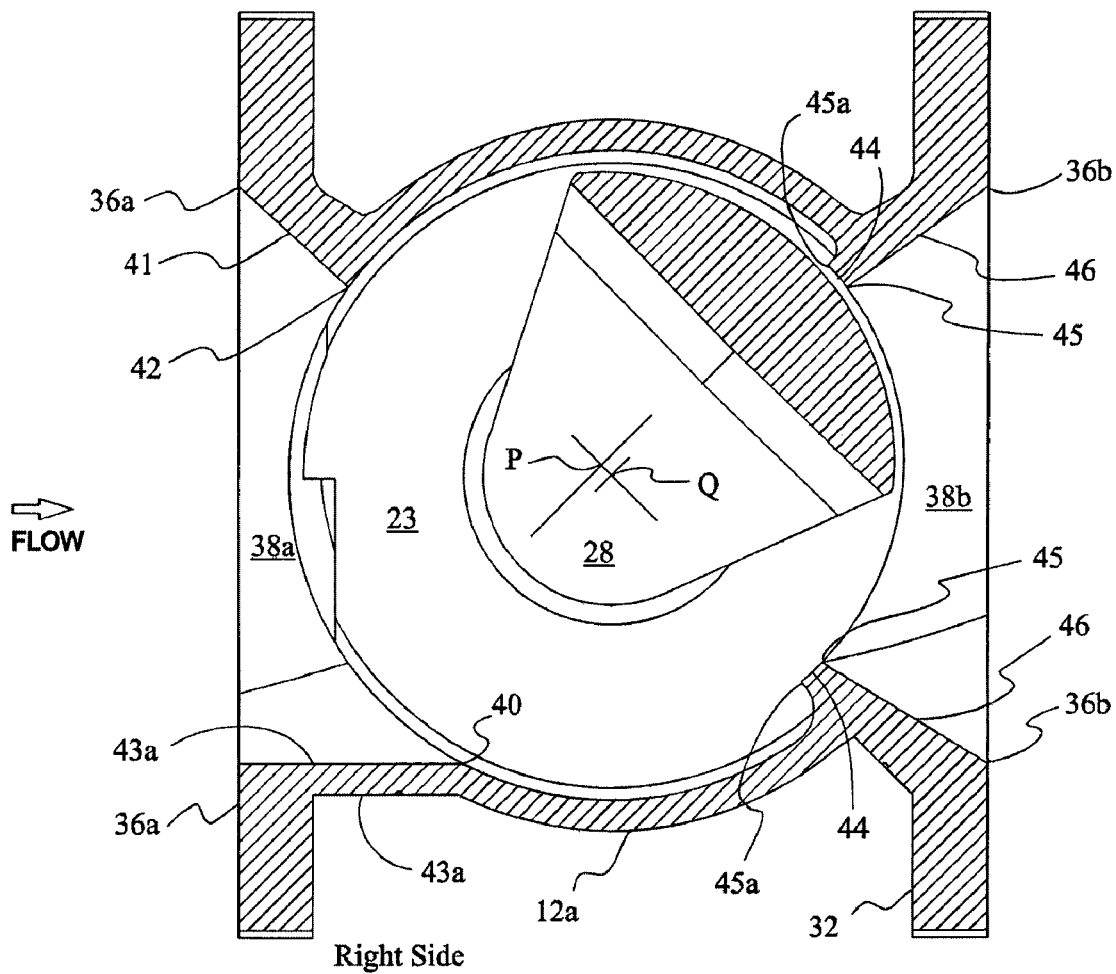
FIG. 6A is a cut away top view of main body 12a of plug valve 10 of FIG. 6, in an open position, illustrating the position of eccentric axis of front sealing face 24 with respect to the central axis of rotation of plug 16.
Figure 6B:
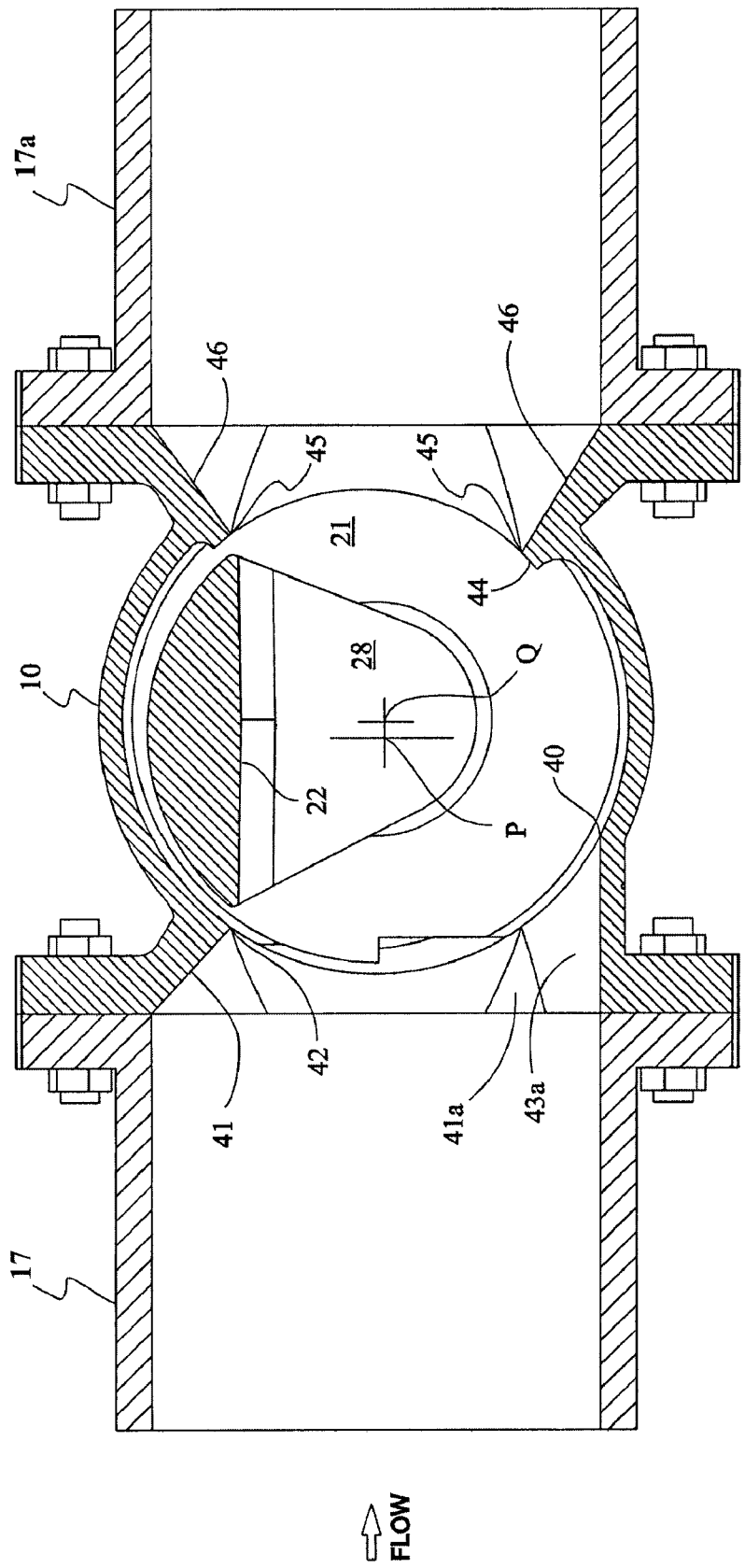
FIG. 6B is a cut-away, top view of an embodiment of the main body with the plug in the open position, connected to standard wall ANSI B 36.10(M) inlet and outlet pipes.
Figure 6C:
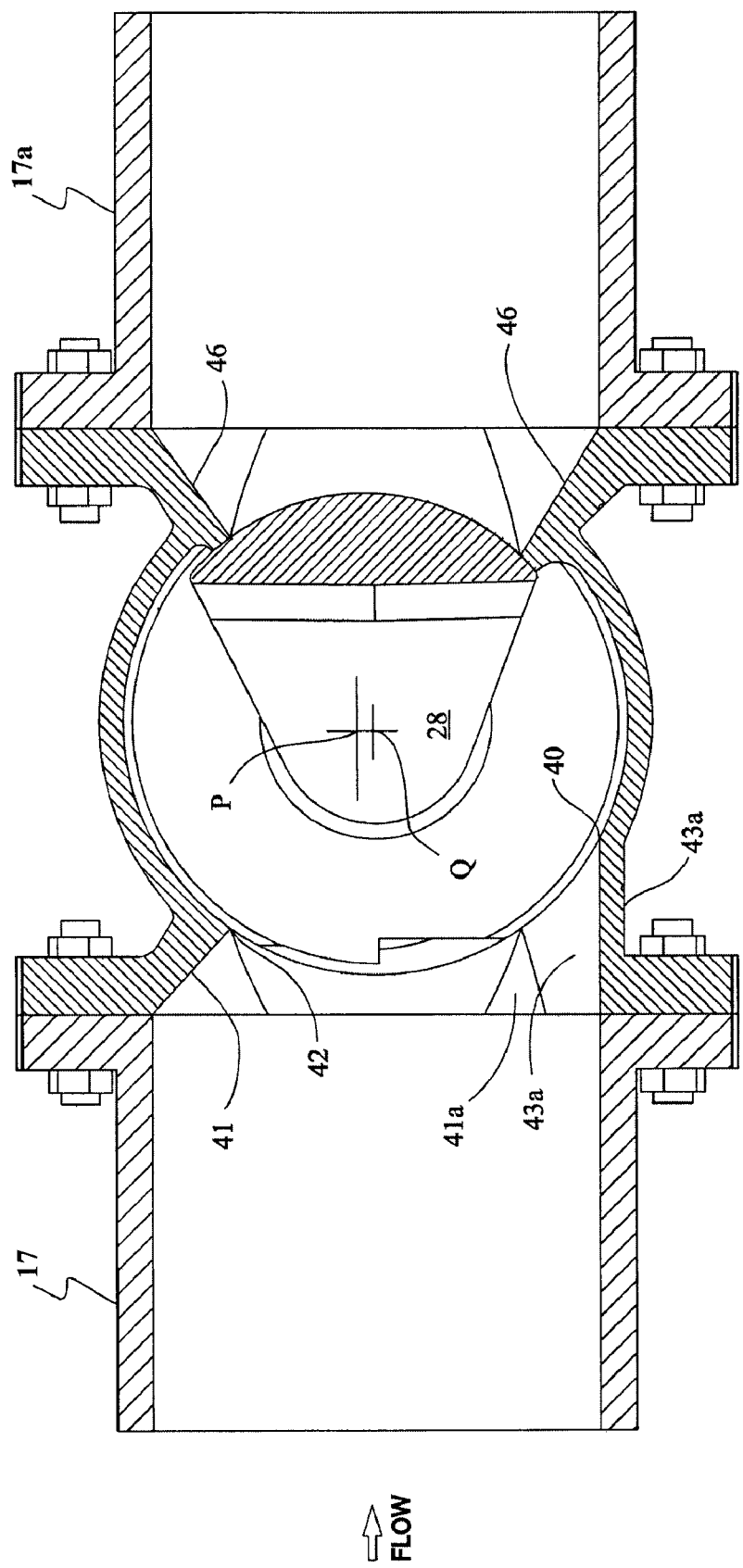
FIG. 6C is a cut-away, top view of an embodiment of the main body with the plug closed, connected to standard wall ANSI B 36.10(M) inlet and outlet pipes.

The eccentricity of plug 16 allows sealing face 24 to move into seat 44 as plug 16 is rotated to the closed position. The tolerances of eccentricity and parallelism between vertical axis of eccentricity Q and vertical axis of rotation P of plug 16 can be optimized by lining front sealing face 24 with a rubber sealing material that has more or less elasticity. The off-set of vertical axis of eccentricity Q from vertical axis of rotation P is determined so that the leading edge of front sealing face 24 contacts the right side of seat 44 before the trailing edge makes contact with the left side of seat 44, as shown in FIG. 6A. This avoids wiping and concomitant abrasion of the elastomer coating on front sealing face 24. Exact alignment of cylindrically shaped eccentric seat 44 with mating front sealing face 24 is not required. Vertical alignment is not an issue, as it does not affect seat 44 contact. Horizontal alignment is provided by the eccentric movement of front sealing face 24 into seat 44, at which point uniform, full contact is made. In this manner, the tolerances between plug journals, main body 12a, and the bearings of bonnet 14 are taken up by the closing torque moving front sealing face 24 into seat 44. The ease of rotating front sealing face 24 tightly and uniformly into seat 44 is especially important when plug 16 is closed and sealed against pressure applied to front sealing face 24 of plug 16. The result is that cylindrically shaped, off-set, eccentric front sealing face 24 of plug region 20 forms a tight, non-leak shut-off seal when it is rotated by concentric shafts 18 and 19 into mating engagement with cylindrically shaped seat 44. In part the tight, non-leak seal is due to the advantage of leverage exerted by the off-set of front sealing face 24 when the concentric shaft 18 and 19 is rotated, i.e., it is due to the eccentric action of front sealing face 24. The eccentric action, FIG. 6A, is illustrated by the arc of the dotted line, which shows that the distance between front sealing face 24 and seat 44 is closing as plug 16 is turned towards a closed valve 10 position. FIG.

6A also illustrates the eccentric action by comparing the arc of the dotted lines to the arc of the solid circle of rotation around which the concentric axis of plug 16 traces. Plug 16 rotates through an arc that is substantially equal to or greater than 95° during closure for wear compensation during the life of plug valve 10. In part the tight, non-leak seal is also due to the elastomeric covering of front sealing face 24. Cylindrical plug 16 and body 12 are easily maintained. It is easy to assembly and disassembly valve 10 and reline cylindrical plug 16 with rubber, which is relatively inexpensive.

The flow area of seat opening 21 of valve 10 is enlarged over that of the prior art valves 69 to the extent that it is equal to or greater than the flow area of inlet pipes and outlet pipes 17 to which it is connected. The prior art valve 69, on the other hand, has a flow area that is approximately 80% of the flow area of inlet pipe 17 and outlet pipe 17a.

Figure 10:
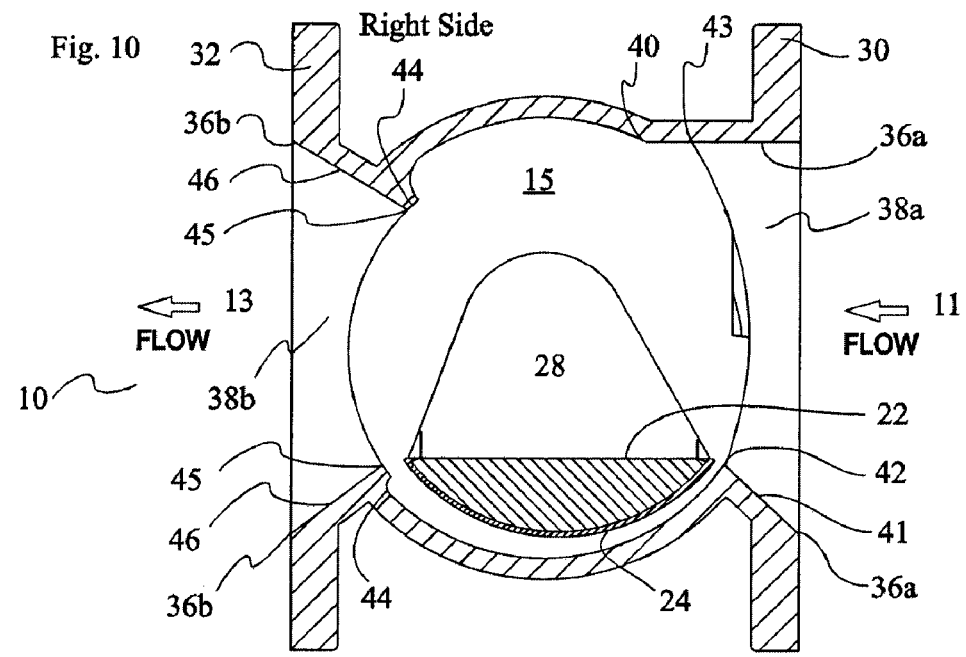
FIG. 10 is a simplified cross-sectional diagram showing a flow path of fluid through main body 12a according to an embodiment with valve 10 in an open position.
Figure 11:
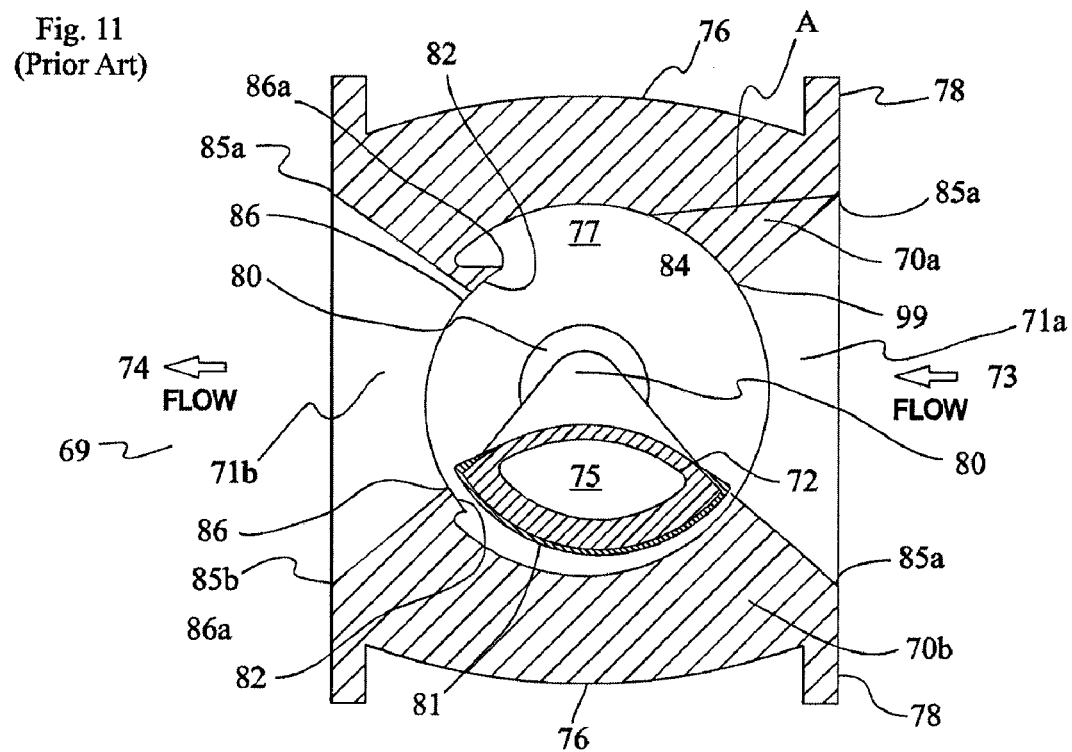
FIG. 11 is a simplified cross-sectional diagram showing a flow path of fluid through a prior art valve 69 arrangement with this valve in an open position.
Figure 13:
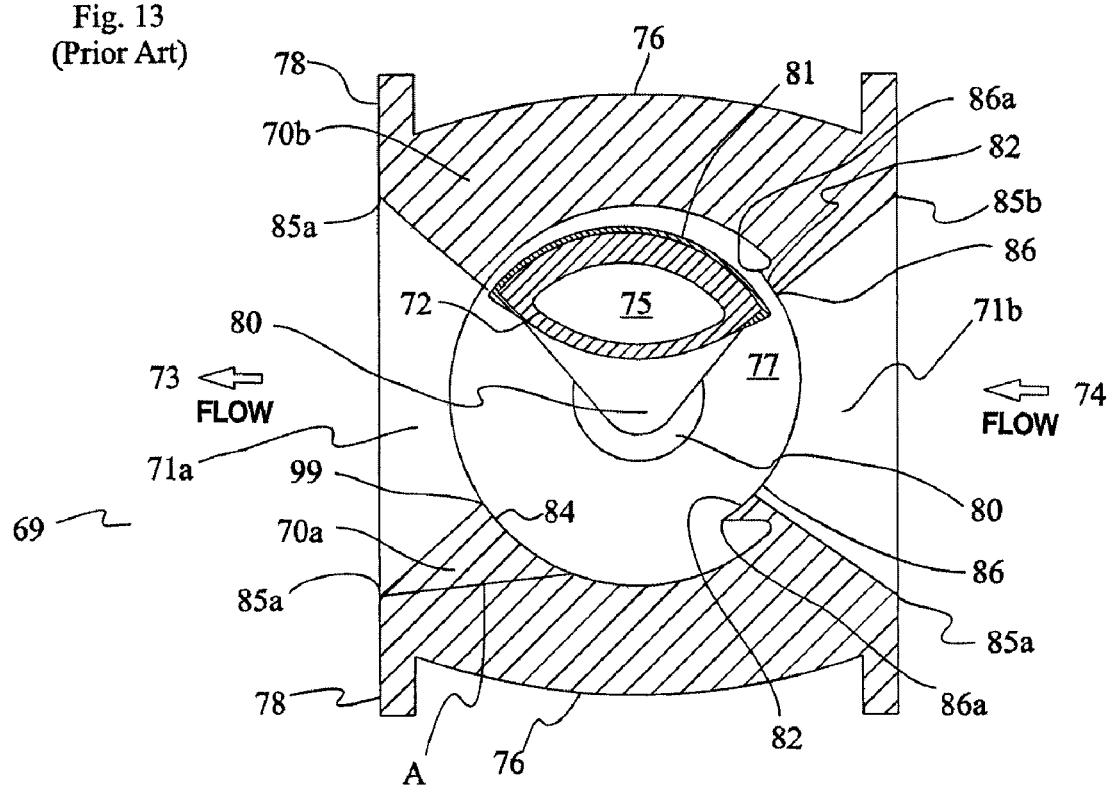
FIG. 13 is a diagram of a prior art valve 69 arrangement similar to FIG. 11, but showing the valve installed in a reverse orientation.

Industrial plug valves 69, such as those shown in FIGS. 11 and 13, have a restriction to fluid flow caused by their rear face 72. The rear face 72 protrudes into the flow path within the chamber 77 of plug valve 69, thereby reducing the flow area of chamber 77 to approximately 80% of the flow area of inlet pipe 17 and outlet pipe 17a. On the other hand, in the embodiments illustrated in FIGS. 10 and 12 of plug valve 10, rear face 22 of plug 16 is a flat, planer surface that does not extend into the flow path of chamber 15. When valve 10 is in the open position, rear face 22 of plug region 20 is flush with inlet edge 42 and outlet edge 45. The flush fit allows for an increased volume of fluid flowing through chamber 15, as compared to prior art valve 69, to the extent that the volume flowing through chamber 15 is equal to or greater than 100% of the flow area of connected inlet pipe 17 and outlet pipe 17a. Moreover, this is accomplished without an increase in the weight of valve 10 and without an increase in turbulence of the fluid flowing within chamber 15. Additionally, it is done so with a family of valves 10 that have standard face to face lengths and that are interchangeable with standard valves.

The flow coefficient of valve 10 is further improved over prior art valve 69 by eliminating the wedge shaped area 70a (approximately defined by the area below line A of FIGS. 11 and 13), but not the wedge shaped area 70b, as shown in FIGS. 11 and 13. Wedge shaped area 70b was not eliminated because it provides very little improvement in the flow coefficient and it protects plug 16 from fluid impingement when the plug is in the open position. Wedge shaped area 70a is in essence a dam that restricts fluid flow and sediment flow through prior art valve 69. Elimination of wedge shaped area 70a in the embodiments of plug valve 10 increases the flow area of entry region 38a and, more importantly, increases the overall flow area of the entire valve 10 so that it is equal to or greater than the flow area of inlet pipe 17 and outlet pipe 17a.

The combination of an increase in the flow area of entry region 38a, chamber 15, and seat opening 21, and outlet region 38b of plug valve 10 as compared to prior art valve 69 yields a valve 10 that has a flow area from inlet flange to outlet flange that is equal to or greater than 100% of the flow area of inlet pipe 17 and outlet pipe 17a. Due to the decreased resistance to flow through valve 10, as compared to prior art valve 69, smaller diameter pipes and smaller pumps may be used in conjunction with valve 10. Additionally, valve 10 will yield annual savings due to decreased usage of power to run the smaller pumps and due to decreased resistance to flow through the valve 10.

When properly installed for suspended solids applications, as shown in FIG. 12, elimination of the prior art obstructions (cylindrical rear surface 72 of plug 75 and wedge shaped area 70a) from valve 10 more effectively allows fluid flow to sweep out settled solids from chamber 15 of valve 10. Elimination of the prior art wedge shaped area 70a from valve 10 avoids the creation of an angular hotspot at circular inlet opening 85a during casting, which also adds strength to main body 12a. Another benefit of enlarging the flow area within valve 10 by making rear face 22 of plug 16 planar rather than cylindrical and by eliminating wedge area 70a, is the ability of a pipeline cleaning "pig" to pass through valve 10 on its trip through pipeline 17. This is a significant problem with the 80% flow area of prior art valve 69. Prior art valve 69 allows some pigs to pass through, but a significant number of pigs cannot pass through.

Figure 7:
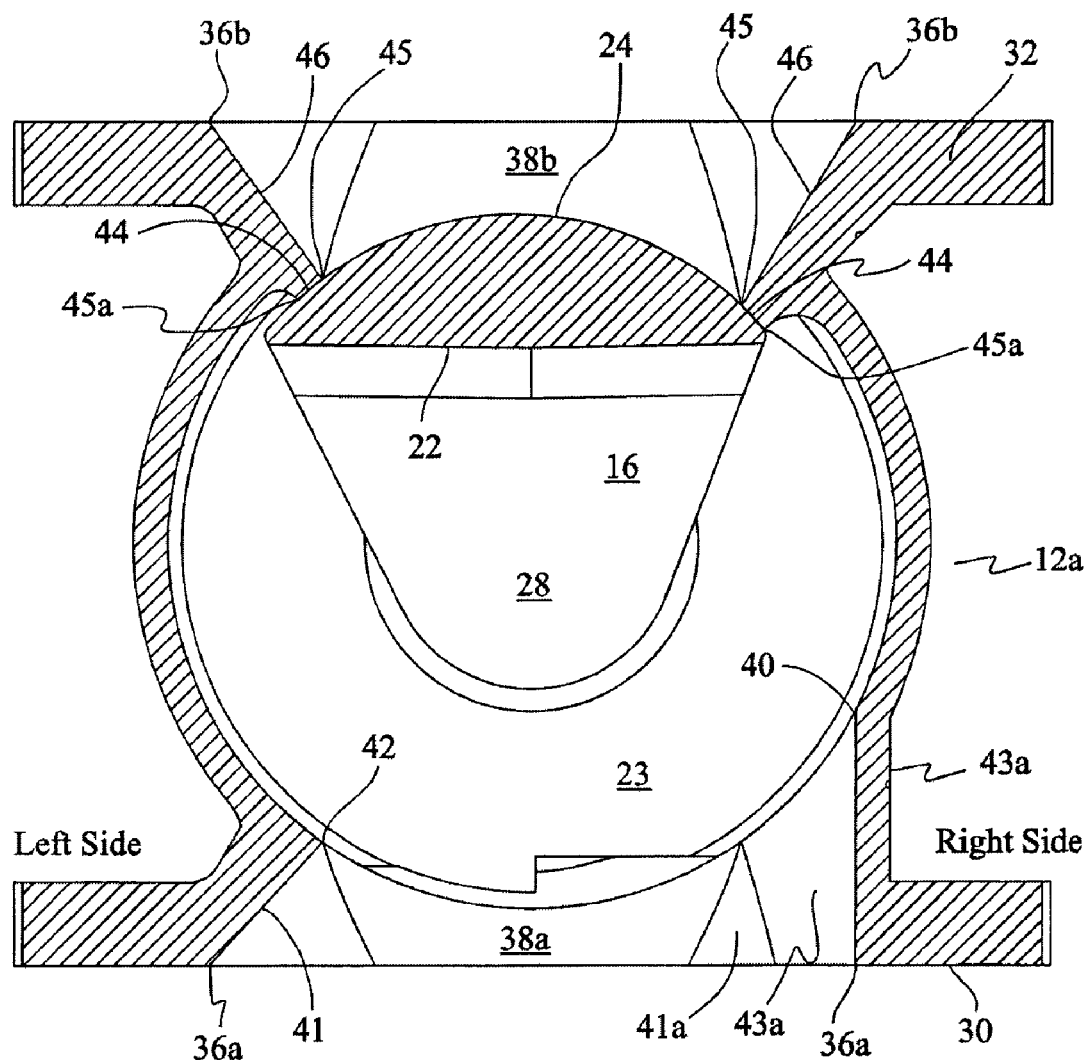
FIG. 7 is a cut away top view of main body 12a of plug valve 10 of FIG. 5 shown in a closed position.

FIG. 7 shows plug valve 10 in a closed position. The front sealing face 24 of plug 16 is in contact with seat 44 to perform the intended shutoff of fluid flow.

Figure 8:
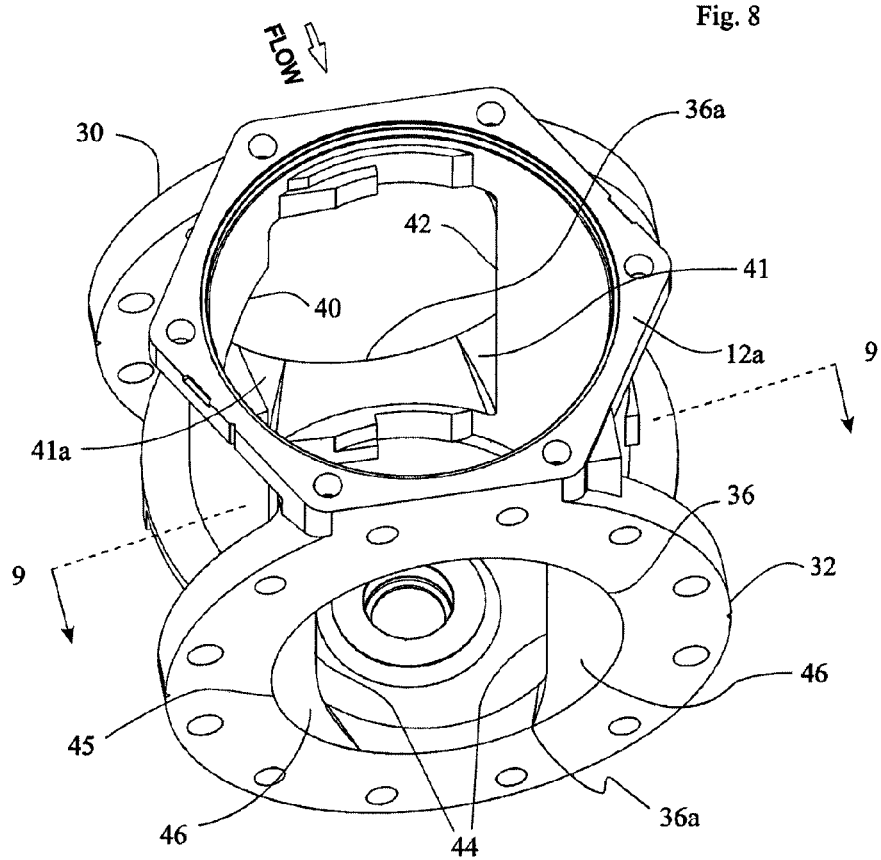
FIG. 8 is a perspective view of main body 12a used in the embodiment of FIG. 1.
Figure 9:
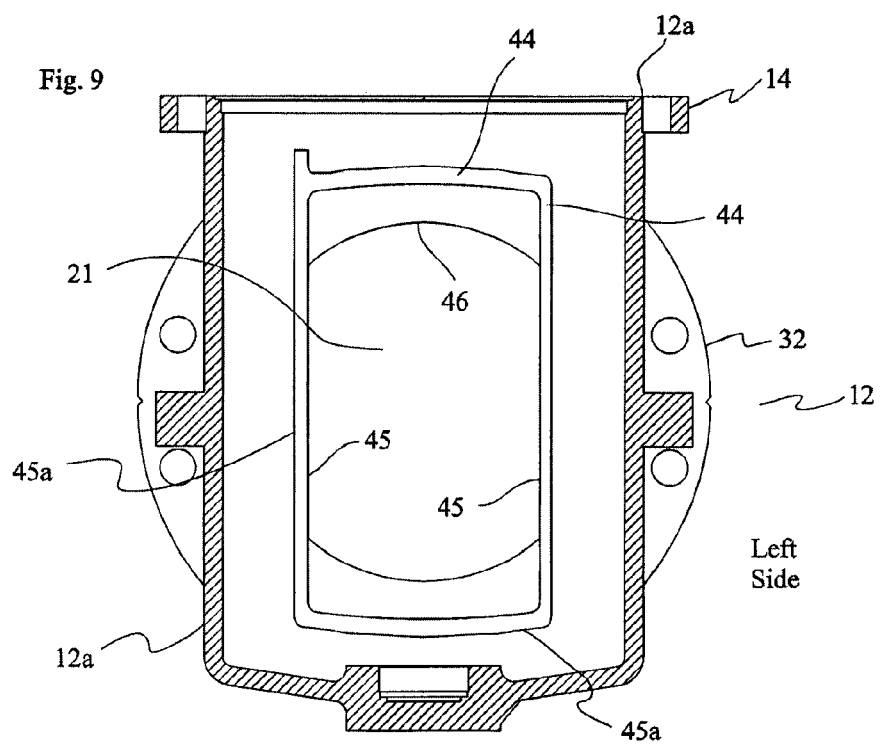
FIG. 9 is a cross-sectional view of main body 12a as shown in FIG. 8, taken through line 9-9.

FIGS. 8 and 9 are perspective and cross sectional views of main body 12a. In FIG. 8, inside of the inlet flange 30 can be seen the vertical inlet edge 42, as well as the more rounded extended inlet rear edge 40 defined by the gradual transition of the entry region 38a. Near outlet flange 32 can be seen the vertical edges of the seat 44 and the tapered surfaces 46 of the transition region.

The cross sectional view of FIG. 9 further shows the rectangular, cylindrical outline of seat 44 and its outlet edges 45, as well as the tapered surfaces 46 of the circular outlet region 38b.

FIG. 10 is a simplified schematic flow diagram which illustrates some of the benefits achieved by various aspects of various embodiments of valve 10. For example, rear surface 22 of plug 16 and its alignment with the vertical flow boundary of inlet edge 42 and the outlet edge 45 of the seat 44 provides a smooth fluid flow through the valve 10. Further, the relatively straight vertical rear edge 40 and the smooth entry region 38a also permits an uninterrupted smooth fluid flow at that area.

While it may appear from the cross section of FIG. 10 that the volumetric flow area at inlet port 11 (inlet port is circular inlet opening 36a) of inlet flange 30 is larger than the volumetric flow area taken between vertical rear edge 40 and rear face 22 of plug 16, this is not the case because during the transition from circular inlet opening 36a to the cross-sectional area between vertical rear edge 40 and rear face 22 (or inlet edge 42) of plug 16 (FIG. 5), a change in the vertical height of the flow cross-sectional area of entry region 38a is also occurring, as shown in FIG. 1. Therefore, the two dimensional flow area at circular inlet opening 36a and between vertical rear edge 40 and rear face 22 (or inlet edge 42) of plug 16 are the same, and the flow area of valve 10 is equal to or greater than 100% of the flow area of the inner diameter of inlet pipe 17 and outlet pipe 17a to which plug valve 10 is connected. Also, the two dimensional flow area at seat opening 21 is equal to or greater than 100% of the flow area of the inner diameter area of inlet pipe 17 and outlet pipe 17a.

FIG. 10 also contrasts this particular embodiment of plug valve 10 with a prior art arrangement as shown in FIG. 11. Some differences that are illustrated include, for example, that a constricting wedge area 70a shown in FIG. 11 is not present in FIG. 10, which instead shows a smooth entry region 38a. Also shown in FIG. 11 is a convex rear surface 72 of the plug 75, which can undesirably restrict the free flow area in chamber 77 of prior art valve 69 compared to the flat rear face 22 of this embodiment of FIG. 10.

FIG. 12 shows plug valve 10 with the flow direction reversed and in a horizontal position. This installation may be preferred for example in applications high in sludge and/or particulates. It will be seen that the smooth entry region 38b allows sediment to be carried out and not form a dam as would occur at location 99 of the prior art shown in FIG. 13 (wherein the valve of FIG. 13 is installed upside down and backwards).

The many features and advantages of plug valve 10 and the method of improving flow capacity are apparent from the detailed specification, and thus, it is intended by the appended claims to cover all such features and advantages of plug valve

What is claimed is:

1. A valve apparatus for use in high-solids applications, the valve apparatus comprising:
   (a) a valve body containing:
      (i) an interior space,
      (ii) a horizontal inlet port defining a cylindrical plug seat, the horizontal inlet port comprising an entry region having a change in outline shape but no reduction in total area,
      (iii) a horizontal outlet port substantially aligned with the inlet port, the outlet port constructed such that the maximum vertical dimension of the outlet port is greater than the maximum vertical dimension of the inlet port, and
      (iv) a bottom transition zone from the interior space to the outlet port, the transition zone having a substantially flush surface with the outlet port; and
   (b) a plug rotatably mounted in the valve body such that the plug rotates around a substantially horizontal axis, the plug comprising:
      (i) a cylindrically curved sealing face, and
      (ii) a substantially planar second face opposite to the cylindrically curved sealing face;
      wherein the plug is configured such that the planar second face is arranged in a substantially horizontal orientation when the valve is open, and the planar second face is arranged in a substantially vertical orientation when the valve is closed.

2. The valve apparatus of claim 1, wherein the cylindrically curved face of the plug is substantial equal to the surface area of the inlet port.

3. The valve apparatus according to claim 1, wherein the valve body has a height, and a cross section taken at an intermediate portion of the height perpendicular to the axis of rotation of the plug has one tapered sidewall and one straight sidewall.

4. The valve apparatus of claim 1, wherein the inlet port is comprised of (i) a circular opening in an outlet flange, (ii) a straight sidewall intersecting the circular opening and terminating in a rear edge, and (iii) a tapered sidewall intersecting the circular opening and terminating in an inlet edge, whereby the straight sidewall increases the flow area of the entry region in comparison to a tapered sidewall.

5. The plug valve of claim 1, wherein the plug rotates through an arc that is greater than or equal to 95° during closure.

6. A valve apparatus for use in high-solids applications, the valve apparatus comprising:
   (a) a valve body comprising:
      (i) an interior space,
      (ii) a horizontal inlet port defining a seat opening, the horizontal inlet port comprising an entry region having a change in outline shape but no reduction in total area,
      (iii) a bottom transition zone between within the interior space adjacent to the outlet port, the bottom transition zone having a surface substantially flush with the outlet port; and
   (b) an eccentrically mounted plug rotatably mounted in the valve body such that the plug rotates around a substantially horizontal axis, the plug comprising:
      (i) a cylindrically curved sealing face, and
      (ii) a substantially planar second face opposite to the cylindrically curved sealing face,
      the plug arranged such that the planar second face is located in a substantially horizontal orientation when the valve is open, and the planar second face is arranged in a substantially vertical orientation when the valve is closed.

7. The valve apparatus of claim 6, wherein the cylindrically curved face of the plug is substantial equal to the surface area of the inlet port.

8. The valve apparatus according to claim 6, wherein the valve body has a height, and a cross section taken at an intermediate portion of the height perpendicular to the axis of rotation of the plug has one tapered sidewall and one straight sidewall.

9. The plug valve of claim 7, wherein the plug rotates through an arc that is greater than or equal to 95° during closure.

10. A valve apparatus for use in high-solids applications, the valve apparatus comprising:
    (a) a valve body comprising:
       (i) an interior space,
       (ii) a horizontal inlet port defining a seat opening, the horizontal inlet port comprising an entry region having a change in outline shape but no reduction in total area,
       (iii) a horizontal outlet port aligned with the inlet port, and
       (iv) a bottom transition zone between within the interior space adjacent to the outlet port, the bottom transition zone having a surface substantially flush with the horizontal outlet port;
    (b) a plug rotatably mounted in the valve body such that the plug rotates around a substantially horizontal axis, the plug comprising:
       (i) a cylindrically curved sealing face, and
       (ii) a substantially planar second face opposite to the cylindrically curved sealing face,
       the plug arranged such that the planar second face is located in a substantially horizontal orientation when the valve is open, and the planar second face is arranged in a substantially vertical orientation when the valve is closed.

11. The valve apparatus of claim 10, wherein the cylindrically curved face of the plug is substantial equal to the surface area of the inlet port.

12. The valve apparatus according to claim 10, wherein the valve body has a height, and a cross section taken at an intermediate portion of the height perpendicular to the axis of rotation of the plug has one tapered sidewall and one straight sidewall.

13. The valve apparatus of claim 10, wherein the inlet port is comprised of (i) a circular opening in an inlet flange, (ii) a straight sidewall intersecting the circular opening and terminating in a rear edge, and (iii) a tapered sidewall intersecting the circular opening and terminating in an inlet edge, whereby the straight sidewall increases the flow area of the entry region in comparison to a tapered sidewall.

14. The valve apparatus of claim 10, wherein the plug rotates through an arc that is greater than or equal to 95° during closure.

* * * * *